No. 892,854.  
A. C. KREBS.  
SLIDING TABLE OR CARRIAGE FOR METAL CUTTING MACHINES.  
APPLICATION FILED APR. 11, 1907.  
PATENTED JULY 7, 1908.
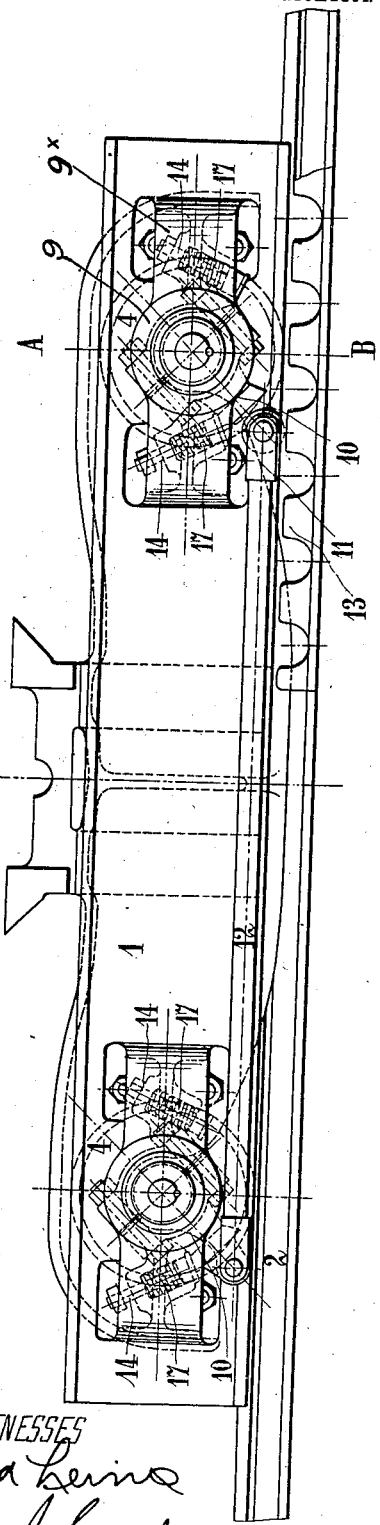
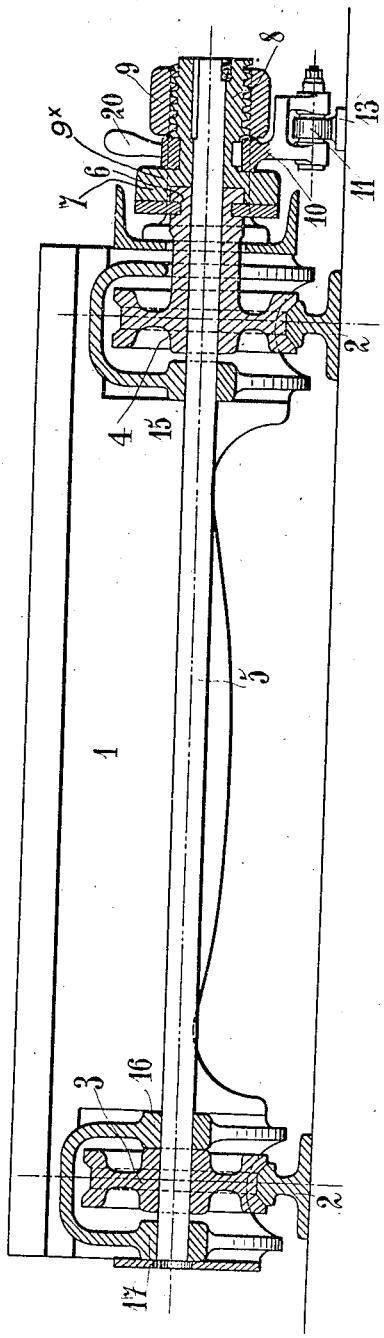

UNITED STATES PATENT OFFICE.

ARTHUR CONSTANTIN KREBS, OF PARIS, FRANCE, ASSIGNOR TO LA SOCIÉTÉ ANONYME DES ANCIENS ETABLISSEMENTS PANHARD ET LEVASSOR, OF PARIS, FRANCE.

SLIDING TABLE OR CARRIAGE FOR METAL-CUTTING MACHINES.

No. 892,854.      Specification of Letters Patent.      Patented July 7, 1908.

Application filed April 11, 1907. Serial No. 367,485.

*To all whom it may concern:*

Be it known that I, ARTHUR CONSTANTIN KREBS, a citizen of the Republic of France, and resident at Paris, France, have invented new and useful Improvements in Sliding Tables or Carriages for Metal-Cutting Machines, which improvements are fully set forth in the following specification.

In machine tools with sliding tables or carriages in which the tool or the work has a reciprocating movement, the working movement being effected in one direction and the return in the other, it is necessary that during the said return movement, the work and the tool should no longer be in contact, and it will be readily understood that it is important, both from the point of view of the quickness of the operation and that of the uniformity of work, that the disengagement either of the tool or of the work should be effected automatically.

This invention relates to a device by means of which the said disengagement can be effected automatically, this device being applicable to any machine tools.

Figure 1 shows the slide rest in elevation. Fig. 2 is a section on line A—B of Fig. 1.

The sliding table 1 travels on two rails 2 2 by means of several sets of rollers 3 and 4, the number of the said rollers depending on the length of the sliding table.

The rollers 3 and 4 are mounted loosely on the spindle 5 which supports the sliding table 1 and along which the latter can slide transversely. The table is provided with hangers having bearings 15, 16, 17 through which the spindle 5 is movable. Thus, as the rollers and the bearings are movable with respect to the spindle, the transverse movement of the table with respect to the latter can take place. The roller 4 has an extension in the form of a socket provided with an annular groove 6 which is engaged by a collar 7 secured to one end of a screw 8 keyed to the spindle 5. A nut 9, secured to the sliding table by a bracket 9×, engages the screw 8 to which a lever 10 is keyed.

All the levers 10 of one and the same sliding table are connected together by rods 12. One of the said levers 10 is provided with a roller 11. During the movement of the sliding table along the rails, the roller 11 moves above the bar 13 provided with notches. The lever 10 can occupy two inclined positions fixed by two stops 14 symmetrically arranged at the right and left hand side of the spindle 5. The said stops 14 are rendered elastic by means of a helical spring 17 arranged in the axis of the stop, or by any other means, but this point is not essential.

Working: Let us assume that the sliding table has reached the end of its operative travel. It is necessary that, at the moment it starts back, it should be laterally moved for the purpose of disconnecting the work from the tool. At the moment of the change of direction of the reciprocating movement of the sliding table, the rollers 3 and 4 change the direction of rotation and have the tendency to drive the spindle 5 in the same direction. The latter experiences, however in following the movement, a resistance due to the friction which it has to overcome in the sockets 9, 15, 16 and 17 in which the said spindle 5 supports the sliding carriage. These two efforts applied to the spindle 5 produce two results: one of driving by the movement of the rollers 3 and 4, and the other of resistance due to the friction in the sockets 9, 15, 16 and 17. These two results are practically equal, in fact each of them is given by the product of the weight of the sliding carriage and the friction coefficient of the surfaces in contact. The spindle 5 will, therefore, be able to turn in the direction of rotation of the rollers 3 and 4 if assisted by a very small effort disturbing the neutral equilibrium of the said spindle in that direction. This latter effort is produced by the spring 17 of the stop 14. As soon as the roller 11 in the return movement of the sliding carriage meets a notch of the bar 13, it will engage with it under the action of the spring of the stop against which it was resting in the preceding movement. Once having become engaged with the notch, the roller, resting against its edge will drive the lever 10 which will turn the spindle and the screw 8 to which it is keyed, and thus bring about lateral movement of the sliding carriage, owing to the nut 9 secured to the carriage, engaging with the screw 8. The result of the said lateral movement will be that the tool will be disengaged from the work. The movement of the lever 10 comes to an end when the roller is completely disengaged from the notch, and the lever 10 strikes the other stop, the spring of which it compresses to the desired extent. The roller will remain in this position above the notches which no longer will have any effect on it, until the following travel. When the sliding carriage has arrived at the end of its return stroke, and is about to change its direction, the reversed action takes place; the screw brings the carriage back in the opposite direction and thus returns the carriage to its first position.

At 20 can be arranged a handle to prevent the action of the notches on the rollers 11, in case it should be desired, during the working, to return the table without disengaging the tool from the work owing for instance to the stopping of the sliding carriage in the center of its travel.

By exercising a pressure on the handle 20, the movement of the roller 11, and consequently of the lever 10 will be prevented.

Having thus described my invention, I claim:

1. In a sliding table or carriage for metal-cutting machines, the combination, with the table, of a spindle upon which it is mounted to slide transversely, means for sliding the table with respect to said spindle, and means which limit the movement of the table longitudinally and operate said sliding means.

2. In a sliding table for metal-cutting machines, the combination of a table, a spindle upon which it is mounted and which is movable transversely with respect to the same, rollers on said spindle by which the table is movable longitudinally, and means for shifting the table with respect to said spindle.

3. In a sliding table for metal-cutting machines, the combination of a table having bearings, a spindle passing through said bearings and movable transversely of the table, rollers on said spindle by which the table is movable longitudinally, a screw connected with one of said rollers, a nut carried by the table and engaging said screw, and means for turning said nut at a predetermined point in the longitudinal travel of the table.

4. In a sliding table for metal-cutting machines, the combination of a longitudinally movable table, a spindle upon which the table is mounted and which is shiftable transversely with respect to the same, means for shifting the spindle and table relatively to each other, and means acting at the ends of the longitudinal movement of the table to operate said shifting means.

5. In a sliding table for metal-cutting machines, the combination of a longitudinally movable table, a spindle upon which the table is mounted and which is shiftable transversely with respect to the same, means for shifting the spindle and table relatively to each other, and stops for operating said shifting means.

6. In a sliding table for metal-cutting machines, the combination of a longitudinally movable table, a spindle upon which the table is mounted and which is slidable transversely with respect to the same, a screw carried by the spindle, a nut carried by the table, a lever for operating said screw, and means for automatically actuating the lever.

7. In a sliding table for metal-cutting machines, the combination of a longitudinally movable table, a spindle upon which it is mounted and which is slidable transversely with respect to the same, means to shift said parts relatively to each other comprising a lever, stops against which the lever abuts, and a rail having notches with which said lever is caused by said stops to engage.

8. In a sliding table for metal-cutting machines, the combination of a longitudinally movable table having bearings, a transversely disposed spindle movable axially in said bearings, rollers loose on said spindle, a screw carried by said spindle, a nut carried by the table, and means for automatically operating said screw.

9. In a sliding table for metal-cutting machines, the combination, with the table and the spindles upon which it is mounted, of means for shifting said table and said spindles transversely with respect to each other, said means comprising automatically operated levers, and a connection between said levers.

10. In a sliding table for metal-cutting machines, the combination, with the longitudinally movable table and the spindle upon which it is mounted and which is slidable transversely with respect to the same, rollers mounted loosely on the spindle, a screw carried by the spindle, a nut mounted on the table and engaging said screw, a lever to turn said screw and carrying a roller, stops to abut against the lever, and a fixed rail having notches into which the roller on said lever is thrown by the stops.

In testimony whereof I have signed this specification in the presence of two subscribing witnesses.

ARTHUR CONSTANTIN KREBS.

Witnesses:
EMILE LEDRET,
H. C. COXE.